Figure 1:
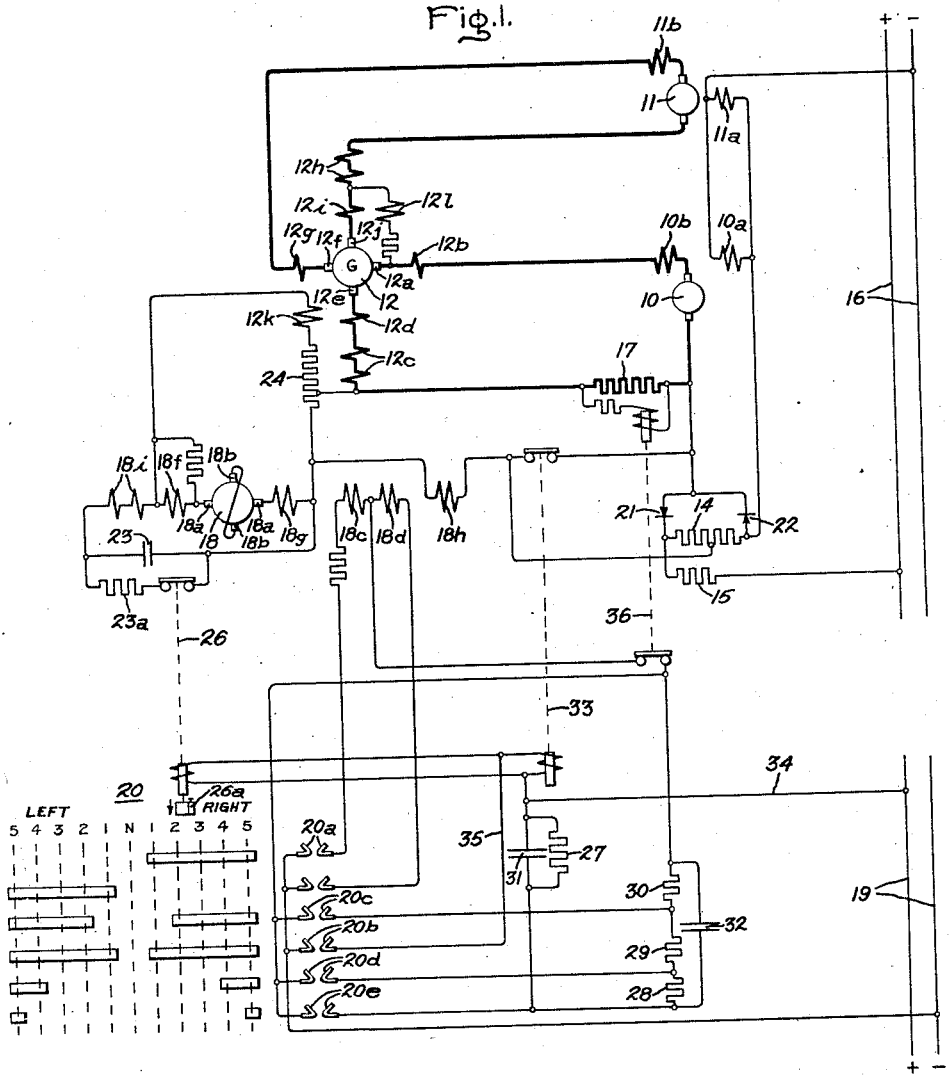

Nov. 10, 1942.                M. A. EDWARDS                 2,301,688
                              CONTROL SYSTEM
                     Filed Sept. 6, 1941           2 Sheets—Sheet 1

Inventor:
Martin A. Edwards,
by Harry E. Dunham
His Attorney.

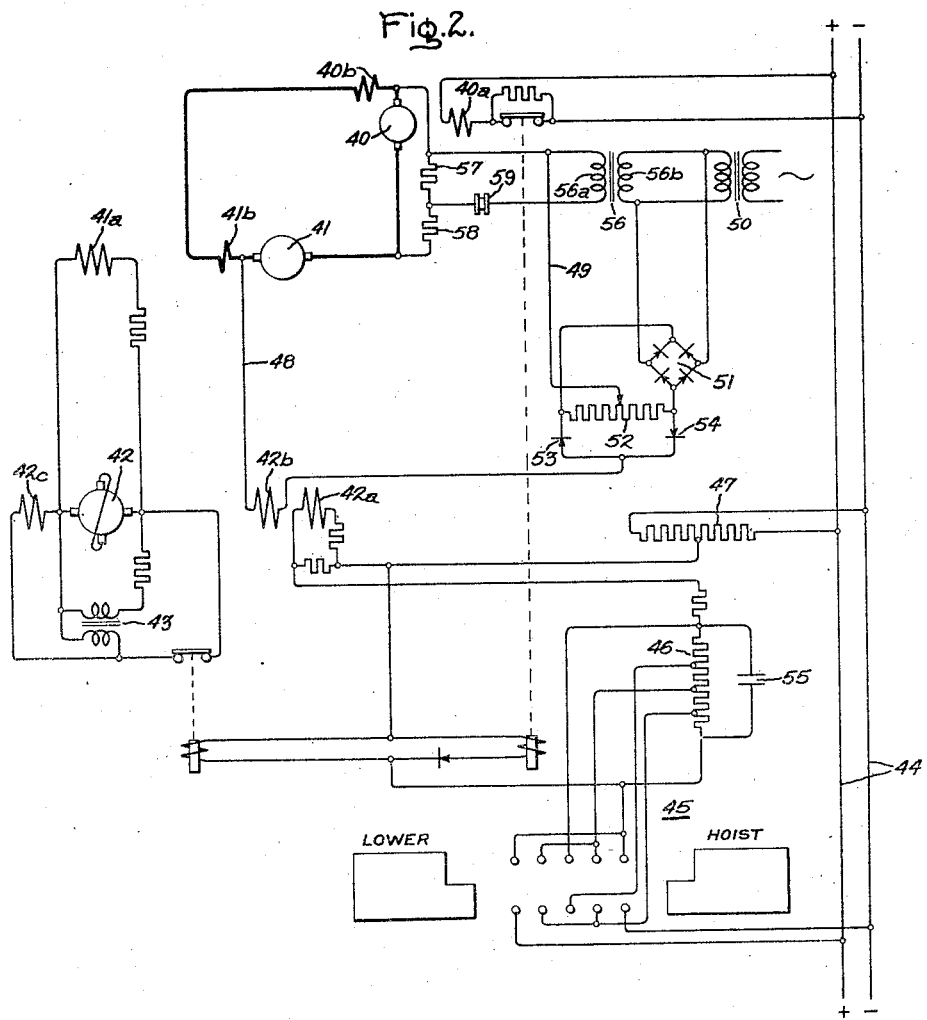

Patented Nov. 10, 1942

2,301,688

UNITED STATES PATENT OFFICE 2,301,688

CONTROL SYSTEM

Martin A. Edwards, Scotia, N. Y., assignor to General Electric Company, a corporation of New York Application September 6, 1941, Serial No. 409,789

12 Claims. (Cl. 172—239)

This invention relates to control systems, more particularly to systems for controlling the operation of electric motors and it has for an object the provision of a simple, reliable and efficient control system of this character.

More specifically, the invention relates to control systems for electric motors in which the motor drives an inertia load and is subjected to repeated reversals which are accomplished by "plugging" the motor. Operations of this character produce abnormally large peak armature currents and these peak currents impose severe strain both on the apparatus driven by the motor and on the driving connections between the motor and the driven apparatus. Accordingly, a further object of the invention is the provision of means for limiting the armature current peak on reversal to safe values.

There are many industrial applications in which a motor must be operated on an intermittent and continuously repeated reversing duty cycle. On such applications, the motor may be started, stopped and reversed several thousands of times in a day. The production of the apparatus driven by such a motor is determined to a very considerable degree by the speed with which such starting and stopping and reversal operations can be effected without damage to the motor or apparatus driven thereby. It is thus a further object of this invention to provide means for effecting the starting, stopping and reversal operations of an electric motor in a minimum time together with means for avoiding dangerous current peaks so that the apparatus driven by the motor may be utilized at its maximum efficiency and productivity without damage to itself or the driving motor.

In carrying the invention into effect in one form thereof, an electric motor is supplied from an adjustable voltage generator which is provided with a separately excited field winding. This field winding is excited by means of an armature reaction excited dynamo-electric machine which is provided with a control field winding. In order that the generator shall have a steeply drooping volt-ampere characteristic, i. e., a characteristic such that the generator armature current remains fairly constant at a maximum value for variations of the voltage throughout the major portion of the range from zero voltage to maximum voltage, the armature reaction excited machine is provided with an auxiliary field winding which is excited by the generator current and which opposes the control field winding, together with means for maintaining this opposing field winding deenergized until the armature current of the generator exceeds a predetermined value. A plural position reversing type master switch and an adjustable resistor controlled thereby and connected in circuit with the control field winding serve to adjust the maximum values of the generator armature current in accordance with the position of the master switch. For the purpose of providing a maximum permissible acceleration of the driving motor a capacitor is connected in parallel with the control field resistor. This capacitor effects field forcing of the adjustable voltage supply generator when the motor is accelerated from rest but does not force the field during a plugging operation and therefore has no tendency to augment the high current peaks which are present during braking or reversal operations. In order to prevent dangerously high current peaks during plugging and reversing operations, the armature reaction excited dynamo-electric machine is provided with an auxiliary opposing field winding which is excited by the voltage of this dynamo-electric machine in such a manner as to limit the rate of change of the voltage of the machine except when the motor is being accelerated from rest.

Figure 3:
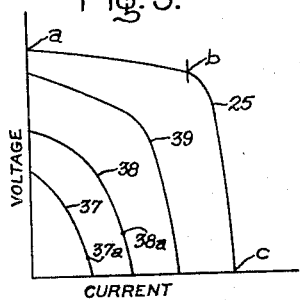

For a better and more complete understanding of the invention, reference should now be had to the following specification and to the accompanying drawings in which Fig. 1 is a simple, diagrammatical illustration of an embodiment of the invention, Fig. 2 is a simple, diagrammatical sketch of a modification and Fig. 3 is a chart of characteristic curves which facilitate an understanding of the invention.

Referring now to the drawings, a plurality of motors 10 and 11 are connected to be supplied from the adjustable voltage generator 12. The generator 12 is driven by any suitable driving means (not shown) such for example as an alternating current wound rotor induction motor or a synchronous motor. The swing motion of an electric shovel involves cyclic repetition of the starting, reversing and stopping operations of the driving motors. For example, a shovel of average size requires about thirty seconds to complete its cycle of operation. When the dipper reaches the top of the bank, the swing motion motor must be accelerated from rest to full speed and it must be plugged and reversed as it arrives over the car which is being loaded and then returned to the bottom of the bank and stopped. For a shovel which is operating continuously, i. e., twenty-four hours per day, this swing motion is repeated about 2100 times per day. Since the present invention is intended for the rigorous operating conditions encountered in this type of service, it may be assumed that the motors 10 and 11 are mechanically coupled to drive the swing motion of an electric shovel, although it will be understood that the invention has other applications such for example, as the hoist motion of a shovel in which extremely severe operating conditions and requirements are also encountered.

The motors 10 and 11 are provided with shunt field windings 10a and 11a, respectively, which are connected in parallel relationship with each other and in series with field resistors 14 and 15 to a source of excitation which is represented by the two supply lines 16.

The generator 12 is a split output generator having two separate output circuits, one for each of the motors 10 and 11. The circuit for the motor 10 extends from the brush 12a through series field winding 12b, motor commutating field winding 10b, armature of motor 10, series resistor 17, commutating field windings 12c, and series field winding 12d to the brush 12e. Similarly, the circuit for the motor 11 extends from the brush 12f, through series field winding 12g, motor commutating field winding 11b, armature of motor 11, commutating field windings 12h and series field winding 12i to brush 12j. Generator 12 is also provided with a main separately excited field winding 12k and a self-excited shunt field winding 12l. The self-excited shunt field winding 12l is connected from the brush 12a to the terminal of the series field winding 12i which is remote from the brush 12j and is so connected that it acts cumulatively with the main separately-excited field winding 12k. The series field windings 12b, 12d, 12g and 12i are connected to be differential with respect to the separately-excited field winding 12k. These series field windings have much fewer turns than the usual series differential field windings. They cause the generator to have a slightly drooping characteristic which promotes stable operation.

Excitation for the main separately excited generator field winding 12k is supplied from a special armature reaction excited dynamo-electric machine 18. This dynamo-electric machine is driven at a speed which is substantially constant by any suitable driving means such, for example, as a synchronous motor (not shown). The dynamo-electric-machine 18 has two sets of brushes. One set of brushes 18a is connected to an external load which in this case is the separately-excited field winding 12k of the adjustable voltage generator. The other set of brushes 18b is short circuited. The axis of the flux which is produced by the current flowing in the short circuited armature conductor is referred to as the short circuit axis and the axis which is displaced 90 electrical degrees from the short circuit axis is referred to as the control axis. If it be assumed that the axis of the short circuit brushes 18b coincides with the short circuit flux axis, then the load brushes 18a are on the control axis. The net flux along the control axis of machine 18 is produced by one or the other of two opposing main control field windings 18c and 18d, series compensating field windings 18f and 18g, current limiting field windings 18h and the armature reaction of the load current.

It is to be noted that the field winding 18h is connected to be energized by the voltage drop across the resistor 17. Consequently, the field winding 18h produces a flux proportional to the current flowing in the loop circuit between the generator 12 and the motor 10 and it is connected to be differential with respect to the main field winding 18d or 18c, whichever happens to be energized. The flux along the short circuit axis of the machine 18 is produced by the armature reaction of the short circuit current. This short circuit axis flux generates the voltage which appears across the load brushes 18a and the control axis flux produces a voltage which appears across the short circuited brushes 18b and causes short circuit current to flow.

The operation of the machine 18 will be readily understood by considering the operation without the current limit field winding 18h and the compensating field windings 18f and 18g and then subsequently considering the effect of these fields on the operation.

Assuming that voltage is applied to the control field winding 18c, a current will begin to build up in this field. Immediately there is generated a voltage in the short circuit path which circulates a large current in the short circuit.

Since the resistance of the short circuit is so low as to be almost negligible, the control field winding 18c is only required to produce a very small flux in order to produce a large current in the short circuit and a correspondingly large armature flux. Furthermore, since the flux of the control field winding need only build up to such a low value, and since the resistance and reactance of the short circuited armature are very low, full load current in the short circuit will be obtained in an exceptionally short time. The armature reaction flux produced by the short circuit current generates a voltage across the load brushes 18a and causes load current to flow. This load current will produce an armature flux which would oppose the flux of the control field winding 18c. This would, of course, mean that the flux of the control field winding 18c would have to be large enough to overpower this control axis armature reaction flux. However, by using the series field windings 18f and 18g through which the load current passes, the armature reaction on the control axis can be completely neutralized. Thus, by the use of these series compensating fields, the control field is only required to produce enough field flux and voltage to overcome the resistance drop in the short circuit, and the time constant or rate of response is, therefore, very fast.

As pointed out in the foregoing, the flux of the field winding 18h opposes the flux of the control field winding. The control field winding 18c is arranged to be connected to the excitation source 19 by means of a suitable reversing type multi-position speed-governing master switch 20, when the master switch 20 is moved to one of its right-hand operating positions. The field winding 18c causes the machine 18 to increase the voltage of generator 12 and the field winding 18h which is excited by the armature current of the generator causes the machine 18 to tend to reduce the voltage of the machine 18 and of the generator 12.

When the dynamo-electric machine 18 supplies current to the separately excited field winding 12k of the generator 12, the generator will supply current to the motors 10 and 11. If the current supplied to the motor 10 exceeds such a value that the voltage drop across the resistor 17 exceeds the drop between the midpoint on the motor field resistor 14 and either of the reversely connected rectifiers 21 and 22, current will flow in the current-limit field winding 18h in such a direction as to cause the dynamo-electric machine 18 to deliver less current to the separately excited field winding 12k of the generator. The motor field resistor 14 provides a bias voltage with respect to which the voltage drop across the resistor 17 in the loop circuit between the generator and the motor 10 is compared and the strength of the current limit winding 18h depends upon the amount by which the voltage drop across the resistor 17 exceeds the bias voltage. The amount of current required to flow in the field winding 18h in order to maintain equilibrium conditions is dependent upon the current in the control field winding 18c. Therefore, with a given adjustment of the equipment, various values of current in the control field winding 18c establish various values of current flowing in the generator output circuit. As the motor 10 accelerates and as the voltage of the generator 12 builds up, additional separately-excited field current is required to excite the generator and overcome saturation, so that for a given adjustment of the field winding 18h and a given current in the control field winding 18c a decrease in the current supplied to the motor would cause the generator voltage to increase. Therefore, the voltage of the generator builds up until the current supplied by the generator attains a low value and the separately excited field current is just enough to maintain that voltage. The current that will be supplied from the generator is just that amount which is sufficient to cause the motors 10 and 11 to operate at constant speed.

Reversal of the excitation of dynamo-electric machine 18 i. e., deenergization of whichever of the field windings 18c or 18d is excited and excitation of the previously unexcited field winding tends to reverse the current flowing in the separately excited field winding 12k of the generator. This causes the voltage of the generator 12 to decrease so that the motors 10 and 11 pump back to the generator thereby to effect deceleration of the motors. In order to prevent too rapid a build-up of current peaks upon reversal of the control field of the dynamo-electric machine 18, an anti-hunt field winding 18i is connected across the load circuit brushes of the machine 18 and a capacitor 23 is included in this circuit. The anti-hunt field winding 18i is so connected that whenever current flows through the anti-hunt field winding and the capacitor 23 as a result of a change in the voltage of the load brushes of the machine 18, the direction of this current will be such as to oppose the change in voltage. This dampens the reversal of the separately-excited field winding 12k and thereby prevents undesirable peak currents on reversal.

A resistor 24 is included in the circuit between the brushes of the dynamo-electric machine 18 and the separately-excited field winding 12k. It will be noted that a portion of this resistor 24 is included in series with the current limit field winding 18h. The voltage across this section of resistor has such a polarity as to cause the voltage applied to the field winding 18h to be decreased in proportion to the magnitude of the current flowing in the separately excited field winding 12k. This causes the generator to deliver relatively higher current at higher voltages than would otherwise be the case.

There are times when it is desired that the anti-hunt field winding 18i shall not oppose any change in the voltage of the machine 18 but shall actually assist the change. For example, when the motors 10 and 11 are to be stopped by moving the master switch 20 to the neutral position when the dipper is returned to the bottom of the bank, it is desirable that the excitation of the separately-excited field winding 12k shall be rapidly reduced so that the voltage of the generator 12 and the speed of the motors 10 and 11 will also be rapidly reduced. For this purpose a contactor 26 whose contacts short circuit the capacitor 23 through a resistor 23a when the master switch 20 is in the neutral position, is provided. When the contacts of this contractor are closed, current flows through the anti-hunt field winding 18i in such a direction that the flux is opposite to the direction of the residual flux. This permits the anti-hunt field 18i to destroy the residual voltage of the dynamo-electric machine 18 and this promotes rapid reduction of the field current of the separately excited field winding 12k of the generator.

Since the field winding 18h of the dynamo-electric machine 18 remains deenergized until the voltage drop across the resistor 17 in the armature circuit of the generator 12 and motor 10 exceeds the bias voltage, the volt-ampere characteristic of the generator will have the usual slightly drooping characteristic such as is represented by the portion a—b of the curve 25 in Fig. 3. In other words, the voltage remains fairly constant for a substantial change in current over this portion of the characteristic. However, after the voltage drop across the resistor 17 has exceeded the bias voltage, the differential field 18h becomes energized and effective to reduce the voltage rapidly with further increases in the current, as indicated by the portion b—c of the curve 25. In other words, for this portion of the characteristic relatively small changes in the current take place for relatively large changes in the voltage. In other words, the current remains fairly constant over a wide range of generator voltage.

A plurality of resistors 27, 28, 29 and 30 are provided for varying the strength of the control field of the dynamo-electric machine 18. These resistors are connected in circuit with the control field winding 18c when the master switch 20 is moved to its first right-hand operating position and are connected in circuit with the control field winding 18d when the master switch is moved to its first left-hand operating position.

For the purpose of forcing the excitation of the dynamo-electric machine 18 and thereby forcing the excitation of the main separately excited field winding 12k of the generator 12 a capacitor 31 is connected in parallel with the resistor 27 and a similar capacitor 32 is connected in parallel with the field adjusting resistors 28, 29 and 30. The forcing capacitors 31 and 32 have a much larger capacity than the anti-hunt capacitor 23. Consequently, the anti-hunt capacitor 23 is unable to limit the rate of rise of voltage of the dynamo-electric machine 18 resulting from the forcing action of the capacitors 31 and 32, as when the motors 10 and 11 are being accelerated from rest.

With the foregoing understanding of the apparatus and its organization in the completed system, the operation of the system itself will readily be understood from the following detailed description. It may be assumed that the dipper has been brought to the top of the bank by the hoist motion of the shovel and that it is desired to swing the dipper to the right to a position over a loading car. At this instant the control apparatus for the swing motion will be in the condition in which it is illustrated in the drawings. This operation is initiated by moving the master switch 20 to the right.

In the first position of the master switch, the cam actuated contacts 20a and 20b are closed. The closing of contacts 20b completes an energizing circuit for the operating coils of contactors 26 and 33. This circuit is readily traced from the positive side of the excitation source 19 through conductor 34 and the operating coils of contactors 26 and 33 in parallel and thence through conductor 35 and contacts 20b to the negative side of the excitation source 19. Contactors 26 and 33 open their contacts in response to the energization of their operating coils. Contactor 33 in opening its contacts interrupts the short circuit around the rectifiers 21 and 22 so that a bias voltage to be derived from the voltage drop across the resistor 17 can be introduced into the circuit of the field winding 18h of dynamo-electric machine 18.

Contactor 26 in opening its contacts interrupts the short circuit about the anti-hunt capacitor 23 thereby rendering it effective.

Contacts 20c of the master switch in closing complete an energizing circuit for the main control field winding 18c of the dynamo-electric machine 18. This circuit is traced from the positive side of the excitation source 19 through resistors 27, 28, 29 and 30 in series, normally closed contacts of contactor 26, control field winding 18c and thence through contacts 20a to the negative side of source 19. The instant that this circuit is completed, the capacitors 31 and 32 which are connected in parallel with resistors 27, 28, 29 and 30 immediately draw a large charging current from the excitation source and this charging current flows through the field winding 18c. This charging current rises practically instantaneously to its maximum value and thereby produces a vigorous and effective forcing action on the excitation of dynamo-electric machine 18. The magnitude of this forcing action is so great as to overpower the retarding action of the capacitor 23 on the rate of rise of the voltage of dynamo-electric machine 18 and consequently the voltage of the machine rises rapidly and applies a vigorous and effective forcing action to the main separately excited field 12k of supply generator 12. As a result of energization of the field winding 12k, generator 12 begins to supply current to the swing motors 10 and 11. The current supplied to these motors rises rapidly to a maximum value such as represented by the point 37a on the curve 37 in Fig. 3. As a result the motors 10 and 11 begin to rotate and swing the dipper towards the right.

When the voltage across the resistors 27, 28, 29 and 30 has risen to full value, the capacitors 31 and 32 become fully charged so that the charging current ceases and the forcing action produced by these capacitors likewise ceases.

The master switch is next moved to the second position in which the contacts 20c are closed to short circuit the resistor 30. As a result of this operation, the excitation of the control field winding 18c and the excitation of the separately excited field winding 12k are further increased and the operation is now in accordance with curve 38 of Fig. 3. The current to the motors 10 and 11 will quickly rise to a maximum value such as represented by the point 38a on curve 38.

On the fourth point of the master switch, the cam actuated contacts 20d are closed to short circuit the resistor section 29 thereby further increasing the excitation of the control field winding 18c and the separately excited field winding 12k with the result that the operation on this point of the master switch is now in accordance with the volt-ampere characteristic represented by the curve 39 of Fig. 3.

On the fifth point of the master switch, the cam actuated contacts 20e are closed to short circuit resistor section 28 and further operation is in accordance with the volt-ampere characteristic represented by the curve 25.

Since the forcing capacitors 31 and 32 were fully charged when the master switch was being moved through the second, third, fourth and fifth positions, the capacitors produced no forcing action and consequently the anti-hunt capacitor 23 was effective during this stage of the operation to limit the rate of rise of voltage of the dynamo-electric machine 18 and therefore of the generator 12 to safe values. In other words, the forcing action of the capacitors 31 and 32 is effective only for a brief period following the completion of the energizing circuit for the control field winding of the dynamo-electric machine 18 when it is most needed, and after this initial forcing action, the anti-hunt capacitor 23 is effective to limit the rate of rise of excitation of the generator field winding 12k.

As a result of the foregoing operation, the speed of the motors 10 and 11 rise rapidly to their maximum values and the dipper is swung rapidly toward the right. Although the foregoing operations were described as taking place in a sequence comprising a series of individual steps, it will be understood that in practice, the operator may move the master switch 20 so rapidly through its successive operating positions that the successive steps take place without any substantial intervening time interval. In other words, the successive steps are merged into a continuous operation. It will be noted that when the contacts 20e close to short circuit the resistor section 28, the forcing capacitor 32 is also short circuited and therefore completely discharged.

Since the entire mass of the cab and the electrical apparatus mounted therein is in motion during the swing motion, the inertia forces involved in acceleration and deceleration are enormous. Therefore, it becomes necessary to apply a vigorous and effective braking action to the apparatus as the dipper approaches a position over the loading car. It may be assumed that during the swing of the dipper to the right, the current supplied to the motor 10 is in such a direction that the polarity of the left-hand terminal of the resistor 17 is positive and the polarity of the right-hand terminal of this resistor is negative. Consequently, as long as the current supplied from the generator 12 to the motor 10 is less than the values at which the voltage drop across the resistor 17 becomes equal to the voltage drop between the midtap of the resistor 14 and the rectifier 22, no current flows in the field winding 18h. When the current supplied to the motor 10 has such a value that the voltage drop across the resistor exceeds the bias voltage between the midpoint of resistor 14 and the rectifier 22, current flows from the left-hand terminal of resistor 17 through the field winding 18h, through the right-hand side of resistor 14 and rectifier 22 to the right-hand terminal of resistor 17 with the result that the field winding 18h opposes the excitation of the main control field winding 18c. In order to produce the braking action necessary to overcome the inertia of the swing motion and to stop the dipper as it swings over the loading car, the drive motors 10 and 11 are plugged by moving the master switch rapidly from the fifth right-hand position back through the off position and then over to the fifth left-hand position. As the master switch is moved back through the fourth, third, second and first positions successively, the resistors 28, 29 and 30 are reinserted in the circuit of the control field winding 18c thereby decreasing its energization and likewise decreasing the energization of the separately excited field winding 12k of generator 12. The reinsertion of resistors 28, 29 and 30 causes the forcing capacitor 32 to become charged again and since the forcing capacitor 31 was never discharged, both capacitors 31 and 32 are charged before the master switch reaches the neutral position.

As the excitation of the control field winding 18c is decreased, the voltage of the supply generator 12 is correspondingly decreased. Owing to the inertia of the apparatus involved in the swing motion and in the driving motors 10 and 11, the motors 10 and 11 operate as generators and pump current back into the generator 12 which now operates as a motor. This pump back current is in the opposite direction from that of the current which was supplied by the generator to the motors 10 and 11 when they were operating as motors. Consequently, the voltage drop across the resistor 17 is reversed and if the voltage drop across the resistor exceeds the bias voltage between the midpoint of resistor 14 and rectifier 21, current will flow from the right-hand terminal of resistor 17 through rectifier 21, through field windings 18h in a direction to aid the magnetization of control field winding 18c and then to the left-hand terminal of resistor 17. In other words, the current limit field winding 18h tends to maintain the voltage of the generator 12 at such a value that the operation will continue to be in accordance with the volt-ampere characteristic represented by the curve 25 during this pump back period thereby tending to avoid any undesirable current peaks. At the same time, the anti-hunting capacitor 23 discharges through the separately excited field winding 12k as the voltage of the dynamo-electric machine 18 decays toward zero thereby augmenting the action of the field windings 18h in maintaining the voltage of the generator 12 at such a value that undesirable current peaks are avoided. The pump back current from the motors 10 and 11 to the generator 12 produces an effective regenerative braking action and causes the speed of the motors 10 and 11 to decrease rapidly.

In the neutral position of the master switch 20 the control field winding 18c is deenergized. As the master switch 20 is advanced through the first, second, third, fourth and fifth positions on the left-hand side the excitation of the reverse control field winding 18d is increased from zero to maximum in a manner identical with that described for the field winding 18c with the exception that the forcing capacitors 31 and 32 do not produce any forcing action owing to the fact that they are completely charged before the master switch reaches the neutral position and the transition from the first position on the right-hand side of the master switch to the first position on the left-hand side of the master switch is usually much less than the time required for the capacitors to discharge. As the master switch is advanced through the first, second, third, fourth and fifth positions on the left-hand side the excitation of the separately excited field winding 12k is reversed and this causes the voltage of the generator 12 to reverse. Owing to the large inertia of the apparatus, the speeds of the motors 10 and 11 do not reach zero when the master switch 20 is moved to the neutral position and consequently, when the voltage of the generator 12 is reversed the voltage is added to the voltage of the motors 10 and 11. This action is known as "plugging" the motors and it is a very effective method of reducing the speed of the motors 10 and 11 to zero because the current flowing in the loop circuits is increased by the addition of the generator voltage to the voltages of the motors 10 and 11. During this plugging period, the forcing capacitors 31 and 32 do not force the field 18b since they were fully charged before the master switch reached the neutral position and consequently the anti-hunt capacitor 23 is effective in causing a current to flow through the anti-hunt field winding 18i in response to a change of the voltage of the dynamo-electric machine 18 in such a direction as to oppose the change. Thus, during the pump back and plugging periods the current limit field winding 18h and the anti-hunt field winding serve to control the rate of change of excitation of the separately excited field winding 12k of generator 12 in such a manner that undesirable current peaks in the armature loop circuits are avoided during reversal.

As the speeds of the motors 10 and 11 reach zero owing to the pump back and plugging operations described in the foregoing, the dipper stops above the loading car and is dumped.

Since the master switch is not in the off position when the motors 10 and 11 reach zero speed, they immediately begin to accelerate in the reverse direction to return the dipper to the digging point at the bottom of the bank. Since the forcing capacitors 31 and 32 are already fully charged, they do not draw any charging current and consequently do not produce any forcing action during this acceleration in the reverse direction. However, forcing action is not required at this time since the voltage of the supply generator 12 has already been increased to a high value during the plugging operation. During this acceleration in the reverse direction, the current limit field winding 18h becomes energized when the voltage drop across resistor 17 exceeds the bias voltage between the rectifier 22 and the midpoint of resistor 14 and thereafter opposes the field winding 18d so as to limit the current supplied to the motors 10 and 11 in accordance with the volt-ampere characteristic represented by the portion of the curve 25 between points b and c.

As the dipper approaches the digging point of the bank, the master switch is returned to the off position. As explained in the foregoing, this results in weakening the excitation of the dynamo-electric machine 18 and decreasing the voltage of the generator 12 so that the motors 10 and 11 pump back into the generator and thereby produce an effective braking action which reduces the speed of the motors. During this pump back period the field winding 18h and the anti-hunt capacitor 23 will act with the field winding 18d to maintain the excitation of the separately excited field winding 12k at such a value that undesirable current peaks are avoided. After an interval of time determined by the setting of time delay device 26a, the contactor 26 closes its contacts to short circuit the anti-hunt capacitor 23 and complete a circuit through the anti-hunt field winding 18i and the resistor 23a to the load brushes of the dynamo-electric machine 18. The voltage produced by the residual magnetism of the dynamo-electric machine 18 causese current to flow in the circuit through the anti-hunt field winding 18h in such a direction that the magnetism of the anti-hunt field winding opposes the residual magnetism and accordingly the residual magnetism is quickly and effectively destroyed and the motors 10 and 11 are quickly stopped.

The setting of the time delay device 26a is such that the contacts of the contactor 26 are maintained open for the period required for the master switch to be moved through the neutral position during a usual plugging operation.

As previously pointed out, the inertia forces involved in the swing motion are extremely large owing to the fact that the entire mass of the shovel must be accelerated and decelerated when the dipper is swung from one position to another. The inertia forces involved in the hoist motion, on the contrary, are quite small owing to the fact that only the mass of the dipper and dipper-stick are accelerated and decelerated. Consequently, the requirements for the hoist motion are somewhat different from the requirements for the swing motion. In order that the maximum productivity of the shovel shall be obtained it is necessary that the dipper be lowered to the bottom of the bank at a very high speed and quickly reversed at the bottom of the bank so that the digging operation may be started with a minimum of time lost during the reversal operation. The apparatus shown in the modification of Fig. 2 is particularly adapted to provide the snappy action essential to maximum productivity. As indicated in Fig. 2, the hoist motor 40 is supplied from an adjustable voltage generator 41 from which the self-excited shunt field winding is omitted and which is provided only with a separately excited field winding 41a and a relatively small series differential field winding 41b. The motor 40 is provided with a separately excited field winding 40a and with a commutating field winding 40b. Although not shown the generator 41 may also be provided with a commutating field winding.

The separately excited field winding 41a of the generator 41 is connected to the load brushes of a dynamo-electric machine 42 which is similar to the machine 18 of Fig. 1. The machine 42 is provided with a main control field winding 42a, a current limit field winding 42b and an anti-hunt field winding 42c.

The anti-hunt field winding 42c is connected to the secondary winding of an anti-hunt transformer 43 whose primary winding is connected to the load brushes of the dynamo-electric machine 42. The flux of the anti-hunt field winding 42c is proportional to the rate of change of voltage of the dynamo-electric machine 42 and the connections between the anti-hunt field winding and the secondary of the anti-hunt transformer 43 are such that the direction of the flux opposes the change in voltage.

The main control field winding 42a of the dynamo-electric machine 42 is connected to a source of separate excitation represented by the supply line 44 for excitation in either direction by means of a multi-position reversing type master switch 45. An adjustable resistor 46 is connected in series relationship with the control field winding 42a and is varied in response to movement of the master switch to its successive positions thereby to adjust the degree of excitation of the control field winding 42a. The right-hand terminal of the control field winding 42a is connected to the midtap of a resistor 47 which is connected across the excitation source 44 and the left-hand terminal of the control field winding 42a is connected to the upper terminal of the excitation adjusting resistor 46 so that current is caused to flow through the field winding 42a in one direction or the other as the lower terminal of the resistor 46 is connected to one side or the other of the excitation source 44 by means of the master switch 45.

The current limit field winding 42b is connected across the series differential field winding 41b of the generator and the commutating field winding 40b of the motor by means of conductors 48 and 49 so as to be responsive to the voltage drop across these field windings. Suitable means are provided for introducing a bias voltage in the circuit of the current limit field winding 42b so that the generator 41 will have the desired steeply drooping volt-ampere characteristic such as represented by the curve 25 of Fig. 3. These bias voltage means comprise a transformer 50 having a primary winding connected to a suitable source of alternating voltage, a full wave rectifier 51 connected across the secondary winding of the transformer and a resistor 52 connected across the output terminals of the rectifier. The conductor 49 is connected to the midpoint of the resistor 52 and reversely connected rectifiers 53 and 54 are connected between the terminals of the resistor 52 and the current limit field winding 42b so that a bias voltage of correct polarity will be available for either direction of current flow in the loop circuit of the generator 41 and the motor 40.

A forcing capacitor 55 is connected in parallel with the excitation adjusting resistor 46 and this capacitor performs the same function as the capacitors 31 and 32 in the modification of Fig. 1.

Owing to the fact that the dipper may strike a large rock or other snag as it cuts up through the bank, it is desirable to have a current limit for the hoist motor 40. Since a motor can commutate a higher current at low voltage than at high voltage it is desirable that the current limit shall be adjusted in inverse proportion to the applied voltage. To provide such a current limit means are provided for varying the bias voltage of the current limit field winding in inverse proportion to the voltage across the terminals of the hoist motor 40. These means comprise a saturable core type reactor 56 having its direct current saturating winding 56a connected across a resistor 57 which is connected in series with a resistor 58 across the armature terminals of the motor 40 and having its reactance winding 56b connected across the secondary winding of the transformer 50. The transformer 50 is designed so that its secondary voltage decreases rapidly with the load. In other words, the transformer has poor regulation.

When the voltage applied to the motor terminals is high, the current flowing in the saturating winding 56a of the saturable core reactor is correspondingly high with the result that the reactance of winding 56b is low. This increases the load on the transformer with the result that the secondary voltage is correspondingly decreased. Conversely, for low voltages across the motor 40, the current supplied to the saturating winding 56a is decreased and the reactance of the reactance winding 56b is correspondingly increased. This decreases the load on the secondary winding of the transformer 50 with the result that the bias voltage supplied to the circuit of the current limit field winding 42b is increased. In other words, the bias voltage is caused to be inversely proportional to the voltage across the armature terminals of the hoist motor 40. The result of varying the bias voltage in inverse proportion to the voltage existing across the armature terminals of the hoist motor is that at high voltages the current limit field winding 42b becomes energized at lower values of motor armature current than at low voltages. In other words, the current limiting action of the current limit field winding 42b takes effect at current values that are inversely proportional to the motor armature voltage. This produces a very effective power limit for the hoist motor with the result that any substantial injury to the motor or shovel apparatus is averted in the event that the dipper should strike a massive obstacle in the bank while digging at high speed.

The amount of current which a motor can commutate is not linearly inversely proportional to the applied voltage. Therefore, the motor can be caused to perform the maximum amount of work which it is capable of performing by varying the current limit in accordance with the commutating ability of the motor. For example, very satisfactory performance is obtained by varying the current limit only slightly as the voltage varies from zero voltage to half voltage and by varying the current limit at a substantially greater rate and in inverse proportion to the voltage between half voltage and full voltage. In other words, the motor can be worked close to its maximum commutating limits by nonlinear adjustment of the current limit in inverse proportion to the applied voltage. Such nonlinear characteristic may be produced by means of a resistance 59 having a non-linear volt ampere characteristic. This resistance may be made of any material having a non-linear characteristic such as copper oxide. It is preferred, however, to use a resistance material consisting of a composition of silicon carbide crystals held together by a suitable binder. Resistance material of this kind is described in United States Patent 1,822,742, Karl B. McEachron, dated September 8, 1931. The current flowing through a resistance of this character increases approximately with the cube of the impressed voltage.

The resistance 59 is preferably connected in the current limit adjusting circuit, i. e., in circuit with the saturating winding 56a of the saturable core reactor 56. As a result, the current limit of the supply generator is adjusted nonlinearly in inverse proportion to the voltage.

The remaining features of the operation of the apparatus of Fig. 2 are so similar to the corresponding features of operation of the system of Fig. 1 that further description is omitted.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination an adjustable voltage generator provided with a self-excited shunt field winding and with a main separately excited field winding, an electric motor supplied from said generator, means for supplying current to said separately excited field winding comprising an armature reaction excited dynamo-electric machine having its load brushes connected to said separately excited field winding and having a control field winding, means for controlling said generator to have a relatively steeply drooping volt-ampere characteristic comprising a field winding on said dynamo-electric machine energized by the current exchanged between said generator and motor so as to oppose the magnetization of said control field winding, and means for varying the excitation of said control field winding thereby to adjust the maximum value of the current supplied to said motor.

2. A control system comprising in combination an adjustable voltage generator having a main separately excited field winding and a self-excited shunt field winding, an electric motor supplied from said generator, means for supplying said main field winding comprising an armature reaction excited dynamo-electric machine having its load brushes connected to said separately excited field winding and having a control field winding, means for limiting the maximum current output of said generator comprising an auxiliary winding on said dynamo-electric machine connected for energization by the current exchanged between said generator and motor to oppose said control field winding, means for rendering said current limiting means ineffective when the current exchanged between said generator and motor is less than a predetermined value, and means for adjusting the current supplied to said control winding thereby to adjust the maximum value of the current supplied to said motor.

3. A control system comprising in combination an adjustable voltage generator having a main separately excited field winding, an electric motor supplied from said generator, means for supplying current to said main field winding comprising an armature reaction excited dynamo-electric machine having its load brushes connected to said main field winding and having a control field winding and a winding for compensating the armature reaction of the load current of said machine, means for limiting the output current of said generator comprising a field winding on said machine opposing said control field winding and excited by the current exchanged between said generator and motor, a shunt connection for said compensating field to cause said dynamo-electric machine to have a drooping volt ampere characteristic, and means for adjusting the excitation of said control field winding thereby correspondingly to adjust maximum values of the current supplied to said motor.

4. A control system comprising in combination an adjustable voltage generator provided with a main separately excited field winding, an electric motor supplied from said generator, means for supplying current to said separately excited field winding comprising an armature reaction excited dynamo-electric machine having its load brushes connected to said generator field winding and having a control field winding, a reversing master switch for controlling the excitation of said control field winding thereby to control the direction of rotation of said motor, and means comprising an auxiliary field winding connected in a loop circuit with the armature of said dynamo-electric machine to oppose said control field winding and a capacitor connected in said loop circuit for causing current to be conducted through said opposing field winding when the voltage of said dynamo-electric machine is changing in response to reversing operation of said master switch thereby to limit the peaks of current exchanged between said generator and said motor during reversal.

5. A control system comprising in combination an adjustable voltage generator provided with a separately excited field winding, an electric motor supplied from said generator, means for supplying exciting current to said field winding comprising an armature reaction excited dynamo-electric machine having its load brushes connected to said field winding and having a control field winding, a reversing master switch having an off position and selectively operable from said position to forward and reverse operating positions to control the excitation and polarity of said control field winding thereby to control the direction of rotation of said motor, means comprising an auxiliary field winding connected in a loop circuit with the armature of said dynamo-electric machine to oppose said control field winding and a capacitor included in said loop circuit for causing current to be conducted through said auxiliary field winding when the voltage of said dynamo-electric machine is changing in response to reversing operation of said master switch thereby to limit the peak values of current exchanged between said generator and motor during reversal, and a contactor responsive to operation of said master switch to said off position for short circuiting said capacitor thereby to provide a circuit through said opposing field winding to destroy the residual magnetism of said dynamo-electric machine and rapidly reduce the current in the separately excited field winding of said generator.

6. A control system comprising in combination an adjustable voltage generator provided with a separately excited field winding, an electric motor supplied from said generator, means for supplying exciting current to said field winding comprising an armature reaction excited dynamo-electric machine having a control field winding and having its load brushes connected to said separately excited field winding, an opposing field winding on said dynamo-electric machine energized by the current exchanged between said generator and motor, thereby to cause said generator to have a relatively steeply drooping volt-ampere characteristic, means for controlling the direction of rotation of said motor and for adjusting the maximum value of the current supplied by said generator comprising an adjustable resistor in circuit with said control field winding and a multi-position reversing master switch for adjusting said resistor and controlling the direction of the current supplied to said control field winding, means providing field forcing of said generator when starting said motor from rest comprising a capacitor connected in parallel with said resistor, and means for limiting the peak values of current exchanged between said generator and said motor during plugging operation comprising a second opposing field winding on said dynamo-electric machine connected in a loop circuit with the armature thereof and a capacitor included in said loop circuit.

7. A control system comprising in combination, an adjustable voltage generator provided with a separately excited field winding, an electric motor supplied from said generator, means for supplying exciting current to said separately excited field winding comprising an armature reaction excited dynamo-electric machine having a control field winding and having its load brushes connected to said separately excited field winding, means for controlling the volt-ampere characteristic of said generator comprising an opposing field winding on said dynamo-electric machine excited by the current exchanged between said motor and generator, means for rendering said volt-ampere characteristic control means inactive when the current flowing between said generator and motor is less than a predetermined value, and means responsive to the voltage supplied to said motor for adjusting the value at which said control means is rendered inactive.

8. A motor control system comprising in combination, an adjustable voltage generator provided with a separately excited field winding, an electric motor supplied from said generator, means for supplying exciting current to said field winding comprising an armature reaction excited dynamo-electric machine provided with a control field winding, means for controlling said generator to have a volt-ampere characteristic such that a relatively small change in current is accompanied by a relatively large change in voltage comprising an opposing field winding on said dynamo-electric machine excited by the current flowing between said generator and motor and means for supplying an opposing biasing voltage to the circuit of said opposing field winding so that said opposing field winding remains deenergized for values of said current less than a predetermined value, and means responsive to the voltage supplied to said motor for varying said biasing voltage in inverse proportion comprising a source of alternating voltage, a saturable core type reactor having its saturating winding energized by the voltage supplied to said motor and having its reactance winding connected in circuit between said source and said biasing voltage supply means.

9. A motor control system comprising in combination, an adjustable voltage generator provided with a separately excited field winding, an electric motor supplied from said generator, means for supplying exciting current to said field winding comprising an armature reaction excited dynamo-electric machine provided with a control field winding, means for controlling said generator to have a volt-ampere characteristic such that a relatively small change in current is accompanied by a relatively large change in voltage comprising an opposing field winding on said dynamo-electric machine excited by the current flowing between said generator and motor and means for supplying an opposing biasing voltage to the circuit of said opposing field winding so that said opposing field winding remains deenergized for values of said current less than a predetermined value, comprising a resistor connected in the circuit of said opposing field winding, a transformer and a rectifier in the secondary circuit thereof for supplying a rectified voltage to said resistor, and means for varying said biasing voltage in inverse proportion to the voltage supplied to said motor comprising a saturable core type reactor having its reactance winding connected in said secondary circuit and having its saturating winding connected to be energized by the voltage supplied to said motor.

10. A control system comprising in combination, an adjustable voltage generator provided with a separately excited field winding, an electric motor supplied from said generator, means for supplying exciting current to said separately excited field winding comprising an armature reaction excited dynamo-electric machine having a control field winding and having its load brushes connected to said separately excited field winding, means for controlling the volt-ampere characteristic of said generator comprising an opposing field winding on said dynamo-electric machine excited by the current exchanged between said motor and generator, means for rendering said volt-ampere characteristic control means inactive when the current flowing between said generator and motor is less than a predetermined value, and means responsive to the voltage supplied to said motor for adjusting the value at which said control means is rendered inactive in non-linear inverse proportion to said voltage.

11. A motor control system comprising in combination, an adjustable voltage generator provided with a separately excited field winding, an electric motor supplied from said generator, means for supplying exciting current to said field winding comprising an armature reaction excited dynamo-electric machine provided with a control field winding, means for controlling said generator to have a volt-ampere characteristic such that a relatively small change in current is accompanied by a relatively large change in voltage comprising an opposing field winding on said dynamo-electric machine excited by the current flowing between said generator and motor and means for supplying an opposing biasing voltage to the circuit of said opposing field winding so that said opposing field winding remains deenergized for values of said current less than a predetermined value, and means responsive to the voltage supplied to said motor for varying said biasing voltage in non-linear inverse proportion to said voltage comprising electrical connections including a non-linear resistance from said motor to said bias voltage supply means.

12. A motor control system comprising in combination, an adjustable voltage generator provided with a separately excited field winding, an electric motor supplied from said generator, means for supplying exciting current to said field winding comprising an armature reaction excited dynamo-electric machine provided with a control field winding, means for controlling said generator to have a volt-ampere characteristic such that a relatively small change in current is accompanied by a relatively large change in voltage comprising an opposing field winding on said dynamo-electric machine excited by the current flowing between said generator and motor and means for supplying an opposing biasing voltage to the circuit of said opposing field winding so that said opposing field winding remains deenergized for values of said current less than a predetermined value, and means responsive to the voltage supplied to said motor for varying said biasing voltage in non-linear inverse proportion comprising a source of alternating voltage, a saturable core type reactor having its saturating winding energized by a voltage derived from said motor and its reactance winding connected in circuit between said source and said biasing voltage supply means and a non-linear resistance included in circuit with said saturating winding.

MARTIN A. EDWARDS.